(12) United States Patent
Chatilov et al.

(10) Patent No.: US 7,756,115 B2
(45) Date of Patent: Jul. 13, 2010

(54) METHOD AND SYSTEM FOR IMPLEMENTING A STATELESS BACK TO BACK USER AGENT

(75) Inventors: Alexandre Chatilov, San Jose, CA (US); Jeffrey Blohm, Cupertino, CA (US); Ting Zhu, San Jose, CA (US); Jagjiwan Virk, Milpitas, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 789 days.

(21) Appl. No.: 11/529,804

(22) Filed: Sep. 29, 2006

(65) Prior Publication Data
US 2008/0080525 A1 Apr. 3, 2008

(51) Int. Cl.
*H04L 12/66* (2006.01)
(52) U.S. Cl. .................... 370/352; 370/230; 370/235
(58) Field of Classification Search .................... None
See application file for complete search history.

(56) References Cited

U.S. PATENT DOCUMENTS

| 7,251,254 | B2 * | 7/2007 | Bond et al. | 370/467 |
| 2005/0047389 | A1 * | 3/2005 | Bond et al. | 370/351 |
| 2005/0237952 | A1 * | 10/2005 | Punj et al. | 370/260 |
| 2006/0050648 | A1 * | 3/2006 | Eydelman | 370/252 |
| 2006/0268858 | A1 * | 11/2006 | Hagale et al. | 370/389 |
| 2006/0271626 | A1 * | 11/2006 | Tidwell et al. | 709/204 |
| 2006/0271686 | A1 * | 11/2006 | Sekaran | 709/227 |
| 2007/0076591 | A1 * | 4/2007 | Khan | 370/216 |
| 2007/0171907 | A1 * | 7/2007 | Mansutti et al. | 370/389 |
| 2007/0253435 | A1 * | 11/2007 | Keller et al. | 370/401 |
| 2007/0258451 | A1 * | 11/2007 | Bouat | 370/389 |

FOREIGN PATENT DOCUMENTS

EP 1653698 * 5/2006

* cited by examiner

*Primary Examiner*—Bob A Phunkulh

(57) ABSTRACT

A method for providing a stateless Session Interface Protocol (SIP) back to back user agent (B2BUA) comprising receiving a SIP message and determining if the SIP message is a SIP request. The SIP request further comprises a request to create an original SIP dialog or a request for an existing SIP dialog. Method further comprises determining if the SIP message is a SIP response. The SIP response may further comprise a provisional SIP response or a final SIP response. Method is suitable for transforming the SIP request, transforming the SIP response, transmitting the transformed SIP request to a new destination, and transmitting the transformed SIP response to a request originator.

16 Claims, 10 Drawing Sheets

METHOD AND SYSTEM FOR IMPLEMENTING A STATELESS BACK TO BACK USER AGENT

FIELD OF THE INVENTION

This invention relates generally to the field of telecommunication data management, and more particularly to a method for providing a stateless Session Initiation Protocol back to back user agent.

BACKGROUND OF THE INVENTION

The Session Initiation Protocol (SIP) is one of several protocols that may be used with the Internet Protocol to support Internet Telephony applications. The SIP specification is defined in the Internet Engineering Task Force (IETF) Request for Comments (RFC) 3261, dated June 2002; the disclosure of which is incorporated herein by reference in its entirety. SIP is an ASCII protocol that facilitates the formation, modification and execution of communication sessions between individual or multiple participants or between networked endpoints, which are referred to as SIP Enabled Devices, User Agents or simply SIP endpoints. The participants may be live, such as videoconferencing clients, an automation component, such as a voicemail server, or a device that can interact in a similar manner. Various interaction types may be incorporated in these communications, including peer-to-peer or multipoint communication. Additionally, users generally possess an address that simulates an email address for identification and location purposes.

Of increased importance in for the SIP protocol is the back-to-back user agent (B2BUA). A B2BUA is a SIP based logical entity that can receive and process messages (such as INVITE) as a SIP User Agent Server (UAS). It also acts as a SIP User Agent Client (UAC) that determines how the request should be answered and how to initiate outbound calls. In the current SIP specification, a B2BUA must typically maintain a SIP dialog state and must participate in all requests sent on the dialogs it has established to process messages properly. However, the current IETF SIP specification (RFC 3261) does not contain any recommendations on how a SIP back to back user agent (B2BUA) may keep a SIP dialog state, thereby leaving this decision to an implementer. As a result, a typical B2BUA maintains a SIP dialog state by storing necessary data locally or remotely for the duration of the SIP dialog. Disadvantageously, storage of the dialog state often requires significant amounts of data under heavy load and complicated mechanisms for data synchronization and recovery in the case of a B2BUA failure.

Therefore, it would be desirable to have a method and system for providing a stateless B2BUA.

SUMMARY OF THE INVENTION

Accordingly, the various embodiments of the present invention described are directed to a method and system for providing a stateless Session Interface Protocol (SIP) back to back user agent (B2BUA). A method for providing a stateless SIP B2BUA comprises receiving a SIP message and determining if the SIP message is a SIP request. The SIP request further comprises a request to create an original SIP dialog or a request for an existing SIP dialog. Method further comprises determining if the SIP message is a SIP response. The SIP response may further comprise a provisional SIP response or a final SIP response. Method is suitable for transforming the SIP request, transforming the SIP response, transmitting the transformed SIP request to a new destination, and transmitting the transformed SIP response to a request originator.

In some embodiments, a system for providing a stateless SIP B2BUA comprises a B2BUA, further comprising a user agent server (UAS) and a user agent client (UAC) concatenated with the UAS. System B2BUA may be suitable for inserting record-route and via headers in both the UAS and UAC. Record-route and via headers may be suitable for transferring necessary SIP dialog state data to a corresponding endpoint and reconstructing the data back on receiving route and via headers in a subsequent SIP message received from the endpoint.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
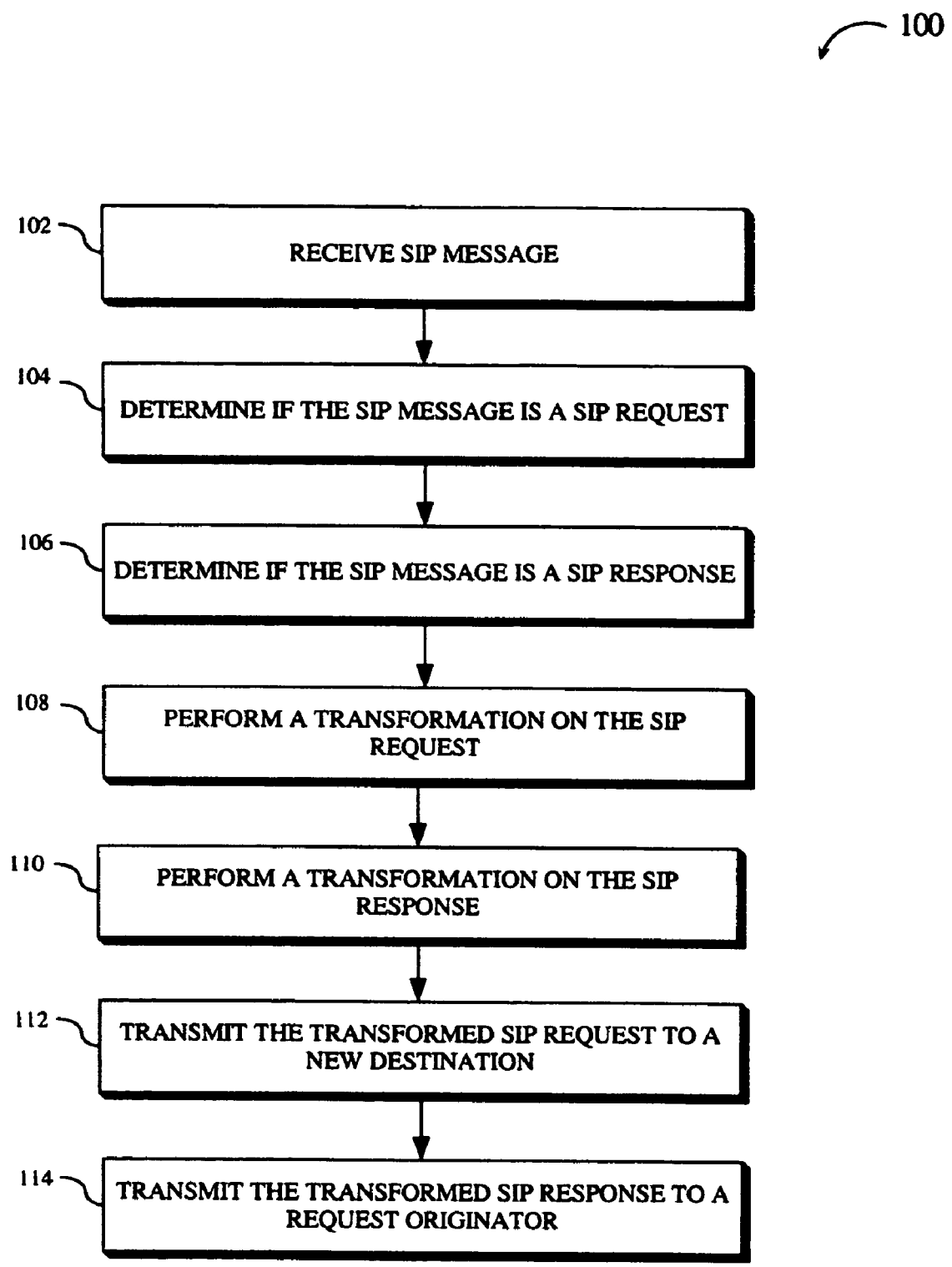
FIG. 1 is a flow diagram of a method according to some embodiments of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Referring to FIG. 1, a flow diagram illustrating a method 100 in accordance with an embodiment of the present invention is shown. Method 100 may comprise receiving a SIP message 102 and determining if the SIP message is a SIP request 104. The SIP request may further comprise a request to create an original SIP dialog or a request for an existing SIP dialog. Method 100 may determine if the SIP message is a SIP response 106. The SIP response may further comprise a provisional SIP response or a final SIP response. Method 100 may transform the SIP request 108, and transmit the transformed SIP request to a new destination 112. Method may also transform the SIP response 110, and transmit the transformed SIP response to a request originator 114.

Method 100 may be suitable for implementation with a back to back user agent (B2BUA). B2BUA may be a concatenation of a User Agent Server (UAS) and a User Agent Client (UAC). UAS may be a server that hosts the application responsible for receiving an SIP request from a UAC, and upon reception returns a response to the request back to the UAC. The UAS may not be limited to issuing a single response to the UAC, but may be suitable for issuing multiple responses to the UAC. Communication between UAS and UAC is generally client/server; although it can also be peer-to-peer. The UAC may be an application suitable for initiating any standard, draft, or custom SIP requests to a UAS. The six standard SIP requests issued by the UAC may comprise: INVITE, ACK, OPTIONS, BYE, CANCEL and REGISTER. It is contemplated that a UAC may be suitable for issuing any other SIP request, such as MESSAGE, INFO, draft requests such as PUBLISH, PRACK, and the like, proprietary requests such as BENOTIFY by Microsoft®, and other like requests. When a SIP session is being initiated by the UAC, the UAC may determine the information essential for the request, which is the protocol, the port and the IP address of the UAS to which the request is being sent. The UAC may also be capable of utilizing information in the request local Uniform Resource Identifier (URI) to establish the course of the SIP request to its destination, as the request URI always specifies an essential host. The port and protocol may not always be specified by the request URI. Thus if the request does not specify a port or protocol, a default port or protocol is contacted.

By definition, the SIP dialog state comprises dialog state information including a dialog ID contained in a call-ID header, a URI contained in a from header on the UAC side and in the to header on the UAS side, and a remote URI contained in the to header on the UAC side and in the from header on the UAS side. SIP header fields are similar to HTTP header fields in both syntax and semantics. In particular, SIP header fields follow the definitions of syntax for the message-header and the rules for extending header fields over multiple lines. Header fields which are needed for proxy processing, such as via, route, record-route, proxy-require, max-forwards, and proxy-authorization, are placed at the top of an SIP request to facilitate rapid parsing.

Method 100 may be suitable for inserting additional record-route and via headers in a SIP dialog initiating request such as an INVITE request. It is to be noted, however, that request may be any other request not containing previously inserted record-route information. When a SIP dialog initiating request is received, a transaction may be created. The request may be scanned to determine if the request contains any inserted route headers. If the request does not contain inserted route headers, the request From and To headers may be saved as From_Original and To_Original. From and To modifications may be performed on the headers by transferring the request to an application that may be located on top of the SIP application. Modifications may also be performed by utilizing static rules configured for requests originating from a particular source address or having a pattern match in a From/To/Any_Other_Headers conversion resulting in new URI/values to be set in From/To/Any_Other_Headers as a result, thereby preserving Any_Other_Headers values as Any_Other_Headers_Original. Any_Other_Header may refer to a placeholder header utilized to indicate any standard, draft, proprietary, or like SIP header may be matched and processed. As a result, Any_Other_Header may be replaced by any other SIP header as desired by an operator. New values may be set in From/To/Any_Other_Headers in a SIP request to a newly defined destination. Additional record-route headers may be inserted into an outgoing request having original values From_Original, To_Original, Any_Other_Headers_Original. An identical set of via headers may be constructed, having the same values as additional record-route headers. Via headers may be suitable for reconstructing any original values if, for example, a negative response from a new destination is received. This modified request may then be transmitted to a new destination.

Method may receive a SIP message 102 such as an initial INVITE request comprising a headers set. Initial headers set may comprise a call-ID such as call_id@host.com. Headers set may further comprise a From URI such as user1@host.com, and a To URI such as user2@host.com. Method may perform a transformation on the received INVITE request and pass the transformed received INVITE request to a UAC in the form:

Call-ID: call_id@host.com
From: user3@b2bua.host.com
To: user4@b2bua.host.com

The user host values described represent examples of values that may be utilized in an embodiment of the method 100. It is contemplated that the From and To values may not be modified after transformation. Additionally, the call-id may not be modified after transformation.

According to at least one transformation performed by the method 100, a subsequent message received from user4 may be modified to reflect the original From and To headers received from user1. Similarly, any subsequent message received from user1 may be modified to reflect the transformed From and To headers sent to user4 originally. Method 100 may encode To and From headers mapping information in at least one additional Record-Route header and at least one additional Via header. The Record-Route header and Via header may be inserted by the method 100. Assuming the method 100 receives an original INVITE request from user1 with the following headers on the UAS side:

From: <sip:user1@host.com>
To: <sip:user2@host.com>

Method 100 may perform the requested To/From headers transformations resulting in the following To/From headers on the UAC side:

From: <sip:user3@b2bua.host.com>
To: <sip:user4@b2bua.host.com>

To save the original To and From headers, the method 100 may insert an additional set of Via headers into the INVITE sent to user4. The additional Via headers may include the original To and From header values, such as:

Original INVITE request From URI in "os" parameter in first additional Via header:
Via: SIP/2.0/UDP fr.net;branch=1.1;os="<sip:user1@host.com>"
Original INVITE request To URI in "os" parameter in second additional Via header:
Via: SIP/2.0/UDP to.net;branch=1.2;os="<sip:user2@host.com>"

It is to be noted that utilization of the via parameter name "os" is only exemplary, and the embodiments of the present invention may utilize any via parameter name as desired by an operator.

In addition, a corresponding record-route set may be constructed also and included into the INVITE to user4. For example, a record-route set may comprise:
  Original INVITE request From URI in first record-route header:
    Record-Route: <sip:user1@host.com>
  Original INVITE request To URI in second record-route header:
    Record-Route: <sip:user2@host.com>

After the additional via and record-route sets are constructed, the INVITE message to user4 may be processed as per RFC 3261 specification. Processing of the INVITE message to user4 may initiate the method 100 to insert the additional via and record-route headers required to keep the method 100 in the path of subsequent messages received from user4 and requests sent to the final destination. When receiving a response from user4, the method 100 may undo one or more performed transformations. In some instances, the record-route set may not be provided in all responses. If the record-route set is available in a received response, the method 100 may extract the request's original To and From URIs from the response's record-route set and may utilize the original To and From URIs in the To and From fields of the response. Method 100 may also store a response's original To and From URIs in the additional record-route set propagated back to user1. If a record-route set is not available, the B2BUA method 100 may utilize information extracted from the via headers to generate the response.

For example, a method 100 in accordance with an embodiment of the present invention may receive a "100 trying" provisional response from user4. Provisional response may comprise a heading such as:
  Via: SIP/2.0/UDP fr.net;branch=1.1;os="<sip:user1@host.com>"
  Via: SIP/2.0/UDP to.net;branch=1.2;os="<sip:user2@host.com.>"
  From: <sip:user3@b2bua.host.com>
  To: <sip:user4@b2bua.host.com>

In this example, the first via header in the response contains the original From header URI and the second via header contains the original To header URI received in the INVITE request from user1. The method 100 may remove the via headers and replace the To and From headers with the original values prior to transmitting a response to user1. Subsequently, the B2BUA system UAS may emit the following response:
  From: <sip:user1@host.com>
  To: <sip:user2@host.com>

In a second embodiment, the method 100 may receive a "200 OK" final response from user4 containing both a record-route headers set and a via headers set, such as:
  Via: SIP/2.0/UDP fr.net;branch=1.1;os="<sip:user1@host.com"
  Via: SIP/2.0/UDP to.net;branch=1.2;os="<sip:user2@host.com>"
  Record-Route: <sip:user1@host.com>
  Record-Route: <sip:user2@host.com>
  From: <sip:user3@b2bua.host.com>
  To: <sip:user4@b2bua.host.com>

The method 100 may save From and To headers URIs received in a final response from user4. Method 100 may also replace a From header URI with the "os" parameter in first via header received, replace a To header URI with the "os" parameter in second via header received, and construct an additional record-route set to send to user1 in the final response, where the first record-route header that may include the saved To header URI <sip:user4@host.com> and the second record-route header may include the saved From header URI <sip:user3@host.com>. A final response may comprise the following headers that may be transmitted to user1:
  Record-Route: <sip:user4@b2bua.host.com>—To header URI received in response from user4
  Record-Route: <sip:user3@b2bua.host.com>—From header URI received in response from user4
  From: <sip:user1@host.com>
  To: <sip:user2@host.com>

After the additional record-route set is constructed, the final response utilized may be processed per the RFC 3261 specification. For instance, when a final response for a request from a new destination is received, via headers may be transmitted back and may contain the original From/To/Any_Other_Headers value. Method 100 may utilize the via headers to restore original values in appropriate headers and may also create or insert an additional record-route headers set representing the modified headers set transmitted or received back to or from the new destination. After a final response is transmitted to an originating user, i.e., user1, system may reconstruct modified headers on each call leg by inspecting route headers received in subsequent requests. Inserted record-route headers and via headers may be detected utilizing tagging such as:
  Record-Route: <Openscape_Header_<HeaderName>_<OriginalHeaderValue>
  Route: <Openscape_Header_<HeaderName>_<OriginalHeaderValue>
  Via: <Openscape_Header_<HeaderName>_<OriginalHeaderValue>

For example:
  Record-Route: <Openscape_Header_From_user1@server1>
  Route: <Openscape_Header_To_userX@server2>
  Via: <Openscape_Header_WhateverHeader_AnyUser@AnyServer>

If a modified header name includes "_" or any other special characters, the header name may be resolved by escaping the name according to the SIP specification. For example a header such as "X-Siemens" may be modified to:
  Record-Route: <Openscape_Header_X%5FSiemens_user1@server1>

The method 100 may then insert the record-route header required to keep the B2BUA in the path of subsequent requests from user1 and responses sent to the original source. When processing subsequent requests, the method may recognize a proprietary set of headers in the route set. For example, the first route header in subsequent requests received may always comprise the SIP URI of the From header, and the second route header may always comprise the SIP URI of the To header for the "other" side of dialog to send request to the original source. For example, a subsequent request from user1 may comprise the following headers set:
  Route: <sip:user3@b2bua.host.com>—From header URI to set in request to user4
  Route: <sip:user4@b2bua.host.com>—To header URI to set in request to user4
  From: <sip:user1@host.com>
  To: <sip:user2@host.com>

And a subsequent request from user4 may comprise the following headers set:
  Route: <sip:user1@host.com>—From header URI to set in request to user1

Route: <sip:user2@host.com>—To header URI to set in request to user1
From: <sip:user4@b2bua.host.com>
To: <sip:user3@b2bua.host.com>

When the method 100 receives subsequent requests from any side it may be suitable for performing a series of steps. For instance, method 100 may save the To and From headers URI received in the request. Method 100 may also replace From header URI with URI from the first Route header received. Additionally, method 100 may replace To header URI with a URI from the second record-route header received and construct an additional via headers set as described above, where the first via header may comprise a saved From header URI in the "os" parameter and the second Via header may comprise a saved To header URI in the "os" parameter. For example, if the method 100 receives a subsequent request from user1 with the following headers:

Route: <sip:user3@b2bua.host.com>—From header URI to set in request to user4
Route: <sip:user4@b2bua.host.com>—To header URI to set in request to user4
From: <sip:user1@host.com>
To: <sip:user2@host.com>

And, after applying system transformations, the request transmitted to user4 may comprise the following headers set:

Via: <sip:user1 @host.com>—From header URI to set in responses to user1
Via: <sip:user2@host.com>—To header URI to set in responses to user1
From: <sip:user3@b2bua.host.com>
To: <sip: user4@b2bua.host.com>

Figure 2:
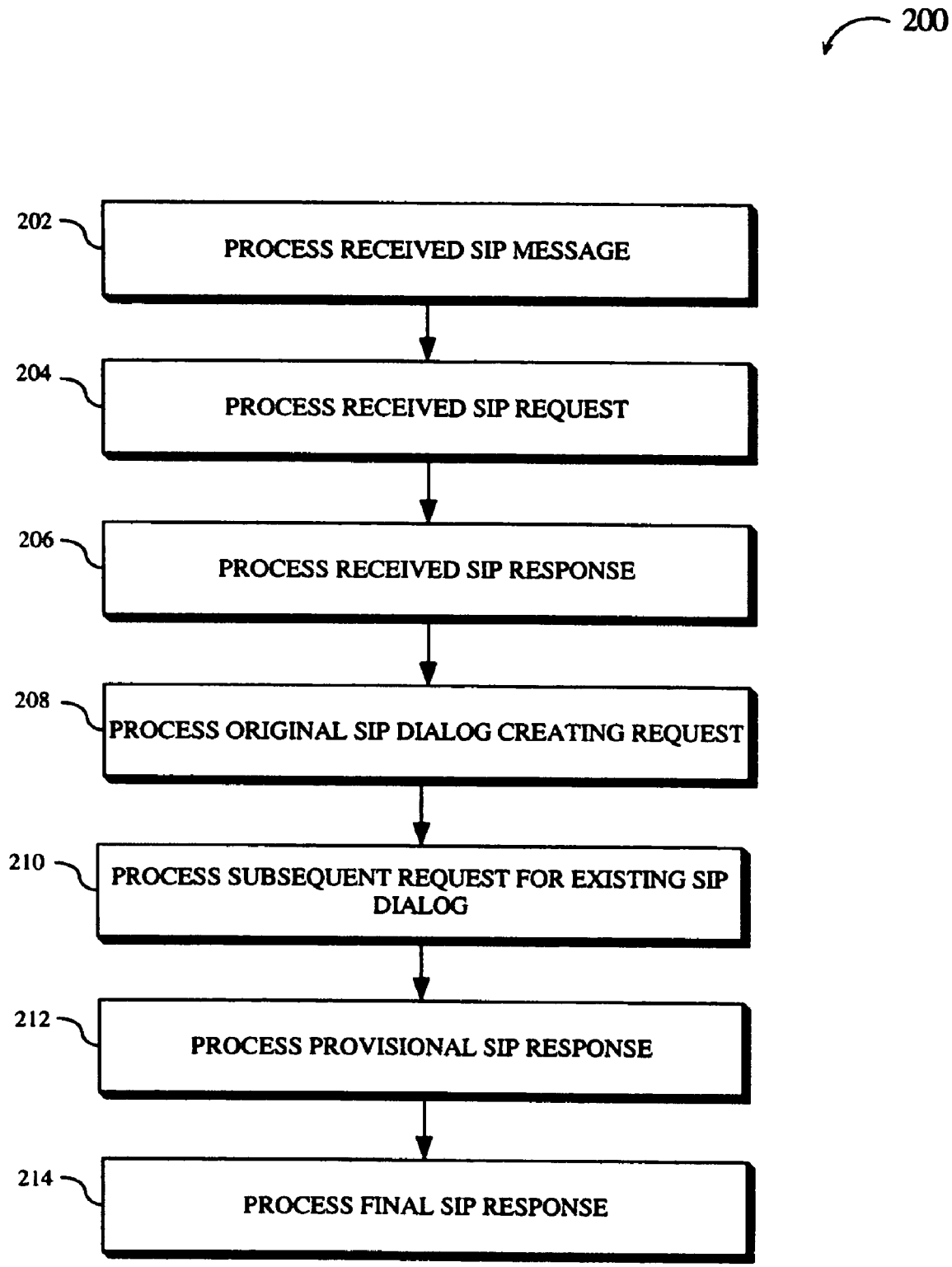
FIG. 2 is a flow diagram of a method according to embodiments of the present invention.

Referring to FIG. 2, a flow diagram illustrating an additional embodiment of a method 200 in accordance with embodiments of the present invention is shown. Method 200 may comprise processing a received SIP message 202. SIP message may be processed to determine if the SIP message is a received SIP request or a received SIP response. If the SIP message is determined to be a received SIP request, method 200 may further comprise processing the SIP request 204. Processing of the received SIP request 204 may further comprise determining if the received SIP request is an original SIP dialog creating request or a subsequent request for an existing SIP dialog. Method 200 may further comprise processing the original SIP dialog creating request 208 or processing a subsequent request for an existing dialog 210 based upon the type of request determination made by processing the received SIP request 204. If the SIP message is determined to be a received SIP response, method 200 may further comprise processing the received SIP response to the received SIP message 206. Processing of the received SIP response 206 may further comprise determining if the received SIP response is a provisional SIP response and generating a provisional SIP response 212 or a final SIP response 214 based upon the type of response determination made by processing the received SIP response 206.

Figure 3:
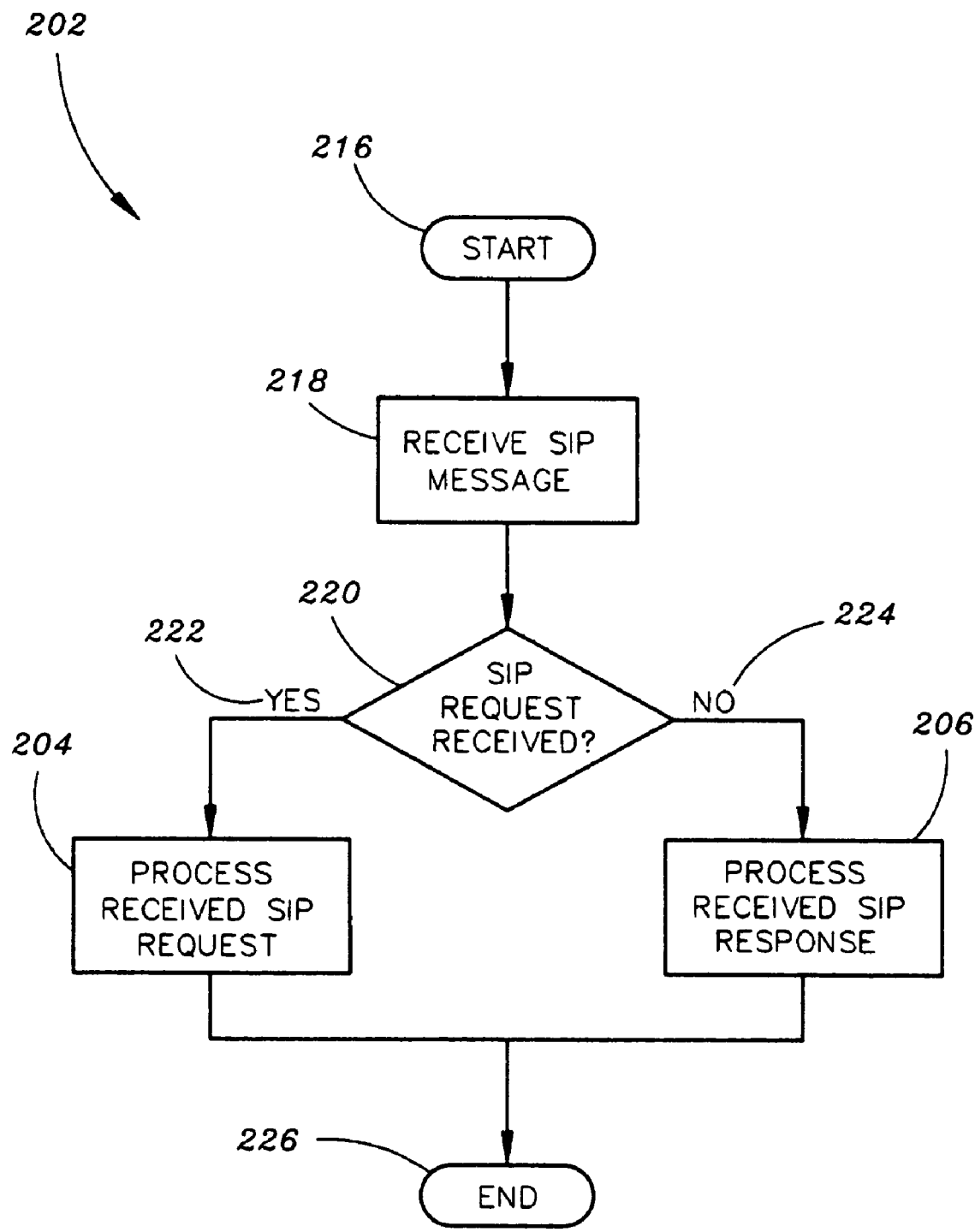
FIG. 3 is a flow diagram illustrating a sub-process of the method of FIG. 2.

Referring to FIG. 3, a flow diagram illustrating the sub-process 202 of the method 200 of FIG. 2 is shown. Sub-process 202 may begin processing of received SIP message 216. Sub-process 202 may receive an SIP message 218. An SIP request received determination may be made 220. If a SIP request has been received 222, the SIP request may be processed 204. If the message is not a SIP request, then it is a SIP response 224, the received SIP response may be processed 206. Processing of received SIP request 204 or processing of received SIP response 206 may end 226 the sub-process 202.

Figure 4:
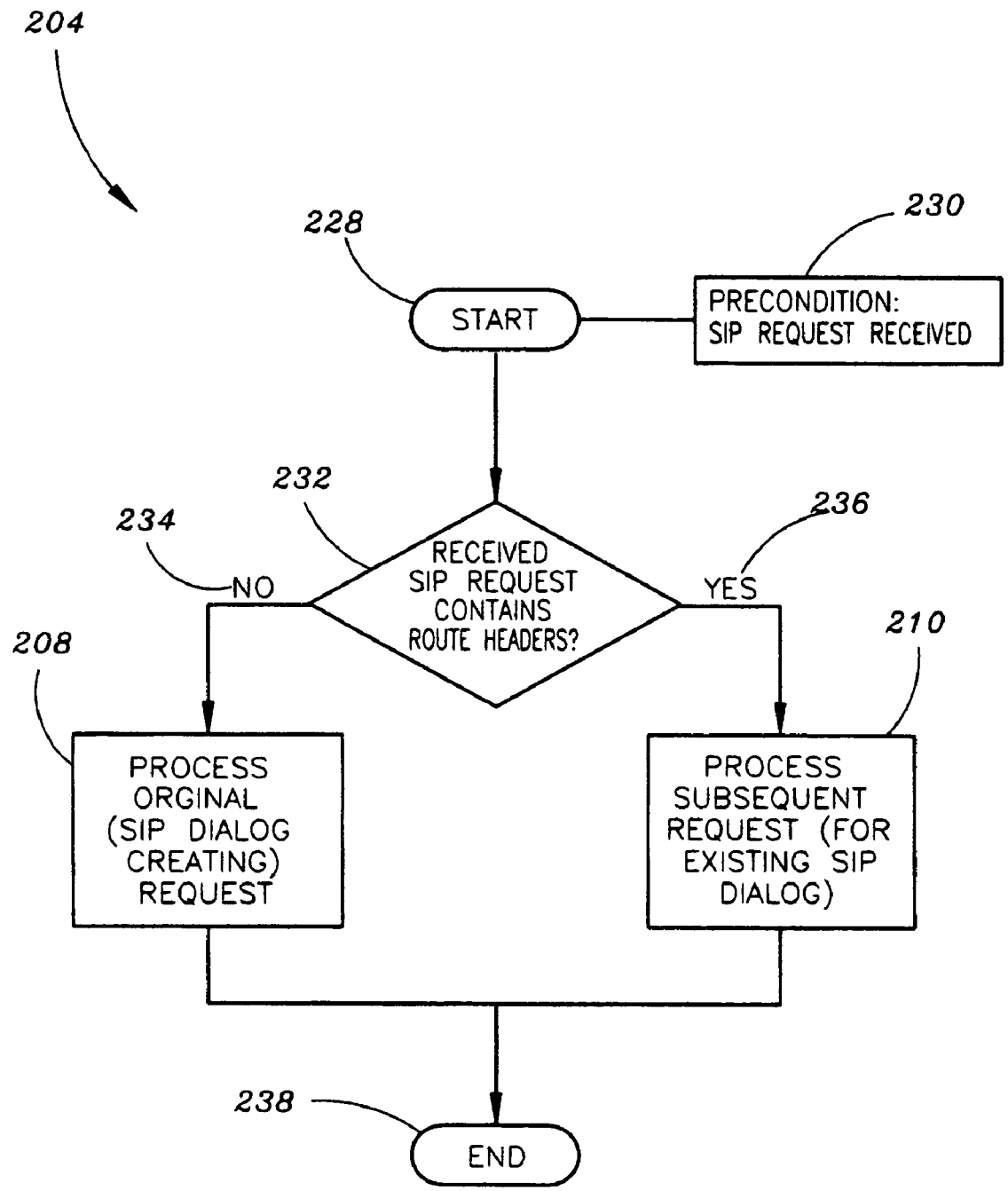
FIG. 4 is a flow diagram illustrating a sub-process of the method of FIG. 2.

Referring to FIG. 4, a flow diagram illustrating a further additional sub-process 204 of the method 200 of FIG. 2 is shown. Sub-process 204 may begin the processing of a received SIP request 228. It is contemplated that sub-process 204 may be subject to a precondition 230. In one embodiment, precondition 230 may be a received SIP request. Sub-process 204 may process a received SIP request by determining if a received SIP request contains route headers 232. If the received SIP request does not contain a route header 234, sub-process 204 may determine that the received SIP request is an original SIP dialog creating request, and may process the original SIP dialog creating request 208. If the received SIP request contains one or more route headers 236, sub-process 204 may determine that the received SIP request is a subsequent request for an existing SIP dialog, and sub-process 204 may process the subsequent request for an existing SIP dialog 210. Processing of original SIP dialog creating request 208 or processing of subsequent request for an existing SIP dialog 210 may effectively end 238 sub-process 204.

Figure 5:
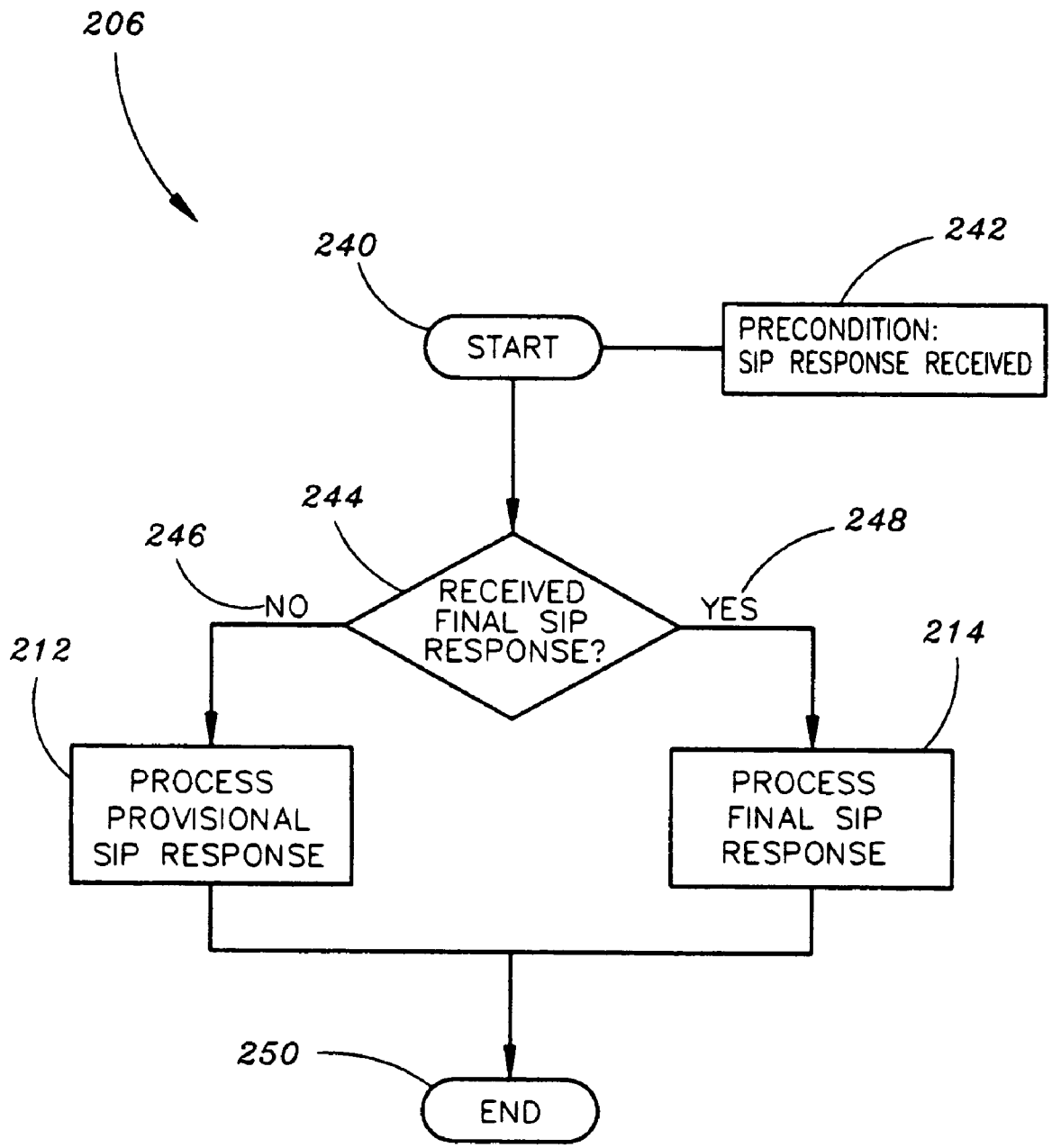
FIG. 5 is a flow diagram illustrating a sub-process of the method of FIG. 2.

Referring to FIG. 5, a flow diagram illustrating a sub-process 206 of the method 200 of FIG. 2 is shown. Sub-process 206 may be suitable for processing a received SIP response. Sub-process 206 may begin 240 and may be subject to a precondition 242. In one embodiment, precondition 242 may be a received SIP response. Sub-process 206 may determine if the SIP response received is a final SIP response 244. If the received SIP response is not a final SIP response 246, sub-process 206 may classify the response as a provisional SIP response and process the provisional SIP response 212. If the received SIP response is determined to be a final SIP response 248, sub-process 206 may classify the SIP response as a final SIP response and process the final SIP response 214. Processing of the provisional SIP response 212 or processing of the final SIP response 214 may effectively end 250 sub-process 206.

Figure 6:
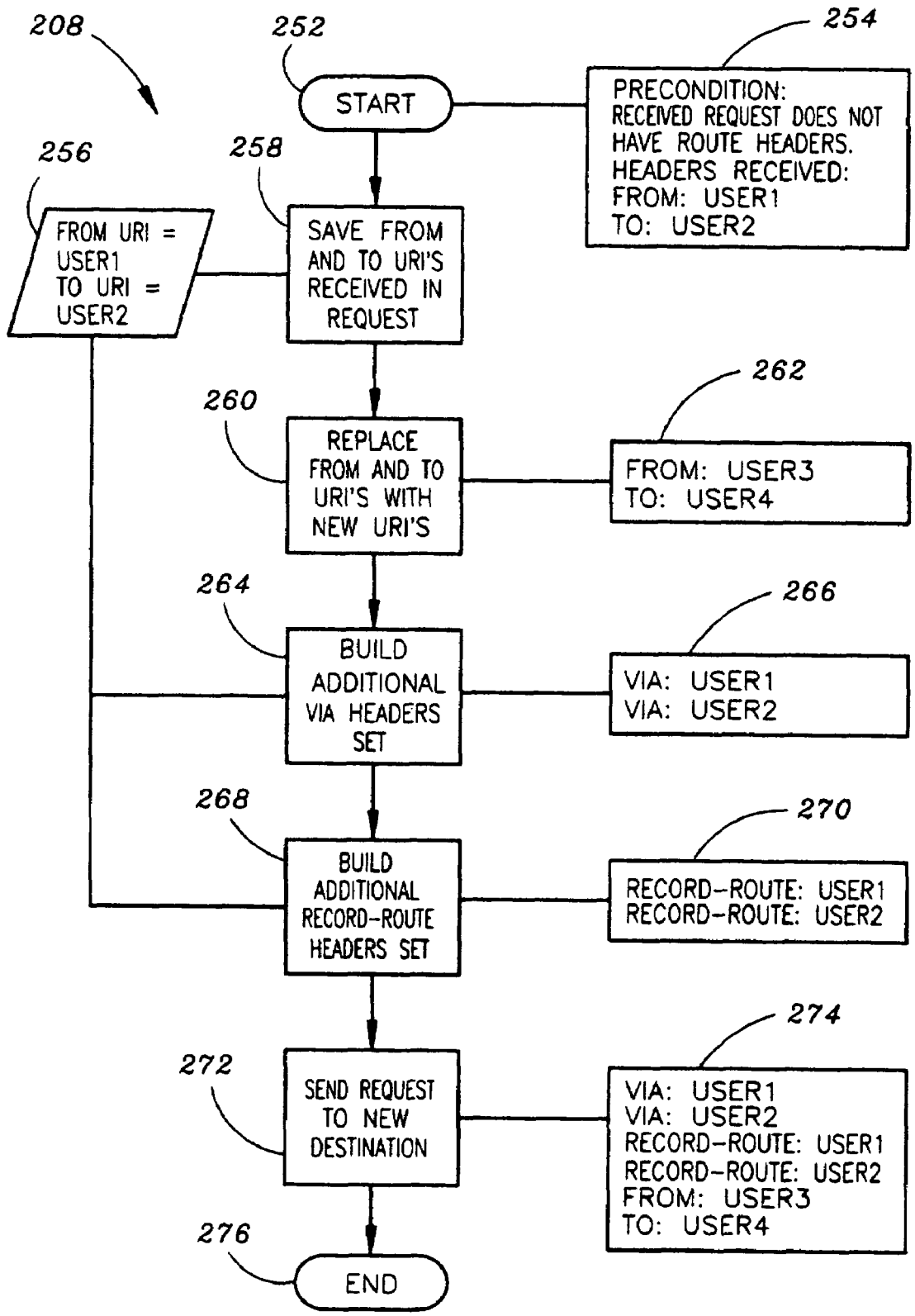
FIG. 6 is a flow diagram illustrating a sub-process of the method of FIG. 2.

Referring to FIG. 6, a flow diagram illustrating a sub-process 208 of the method 200 of FIG. 2 is shown. Sub-process may be suitable for processing an original SIP dialog creating request. Referring to FIG. 4, a determination may be made that a received SIP request is an original SIP dialog creating request. Sub-process 208 may begin 252 and may be subject to a precondition 254, such as the precondition that the received SIP request does not contain route headers. Header URIs 256 may be received by sub-process 208. For the purposes of demonstrating sub-process 208 in a specific example, header URIs received 256 may be: from: user1; to: user2. Received to and from header URIs 256 may be saved in an original dialog creating SIP request 258. To and from header URIs 256 may be replaced with new URIs 260. In this example, new URIs may be from: user3; to: user4. It is to be noted that new header URIs may not be limited by this example to user3 and user4, but may be any new header URI as desired by an operator. Sub-process 208 may build an additional via headers set 264. Via headers set 266 may be, for example, via: user1; via: user2. Sub-process 208 may also build an additional record-route set 268. Record route set 270 may be, for example, record-route: user1; record-route: user2. Sub-process 208 may transmit a request to create an original SIP dialog to a new destination 272. New destination 274 may be, for example: via: user1; via: user2; record-route: user1; record-route: user2; from: user3; to: user4. Transmitting a request to a new destination 272 may effectively end 276 sub-process 208.

Figure 7:
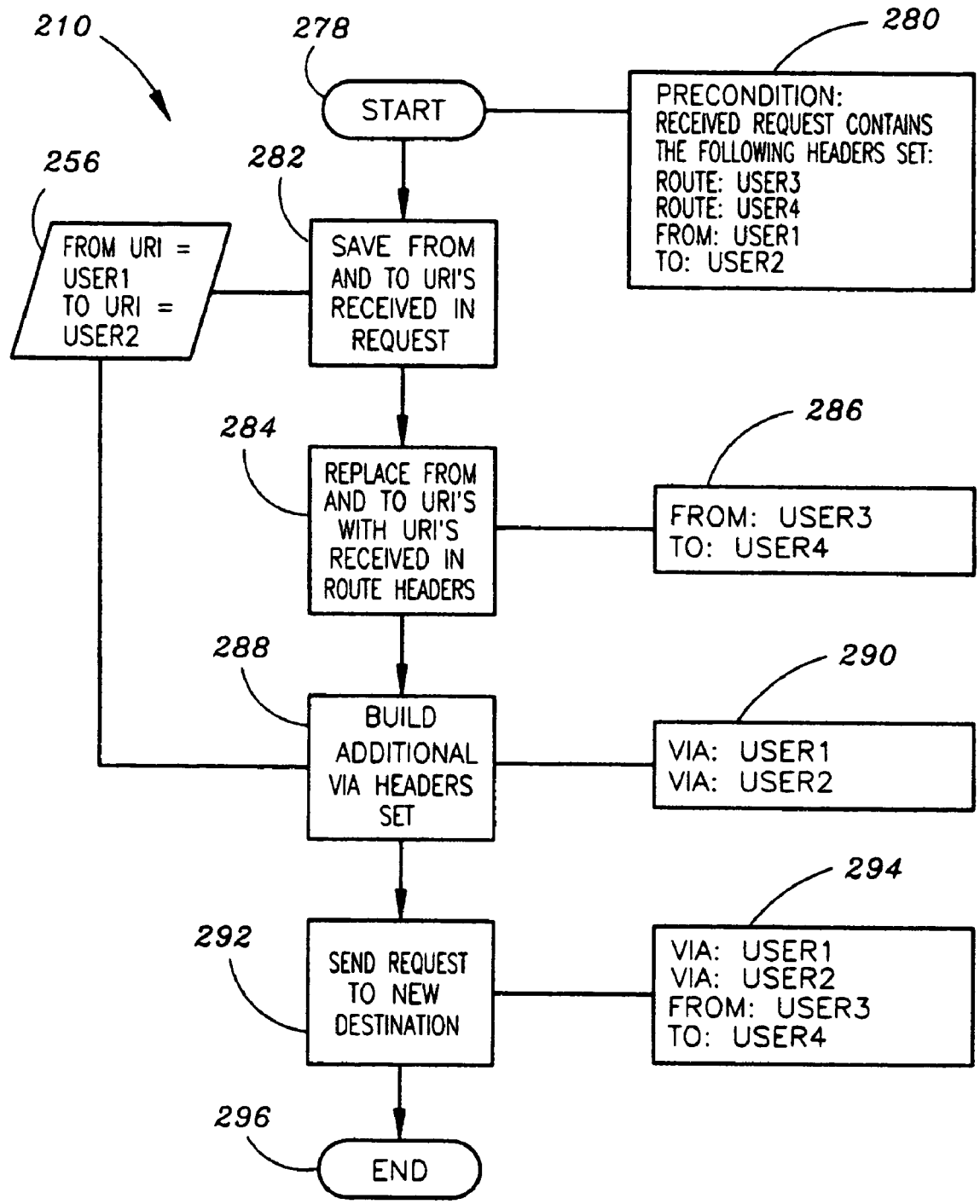
FIG. 7 is a flow diagram illustrating a sub-process of the method of FIG. 2.

Referring to FIG. 7, a flow diagram illustrating a sub-process 210 of the method 200 of FIG. 2 is shown. Sub-process 210 may be suitable for processing subsequent requests for an existing SIP dialog. Sub-process 210 may begin 278 and may be subject to a precondition 280. In the example illustrated in FIG. 7, precondition 280 may be that a received request contains a headers set, such as: route: user3; route: user4. The precondition 280 may also include the header URIs received 256. For the purposes of demonstrating sub-process 210 in a specific example, header URIs received 256 may be: from: user1; to: user2. Received to and from header URIs 256 may be saved in a subsequent request for an existing SIP dialog 282. Header URIs 256 may be received by sub-process 210. To and from header URIs 256 may be replaced with URIs received in the route headers 284. In this example, new URIs may be from: user3; to: user4. It is to be noted that a route header URI may not be limited by this example to user3 and user4, but may be any route header URI as desired by an operator. Sub-process 210 may build an additional via headers set 288. Via headers set 290 may be, for example, via: user1; via: user2. Sub-process 210 may transmit a request for an existing SIP dialog to a new destination 292. New destination 294 may be, for example: via: user1; via:user2; from: user3; to: user4. Transmitting a request to a new destination 292 may effectively end 296 sub-process 210.

Figure 8:
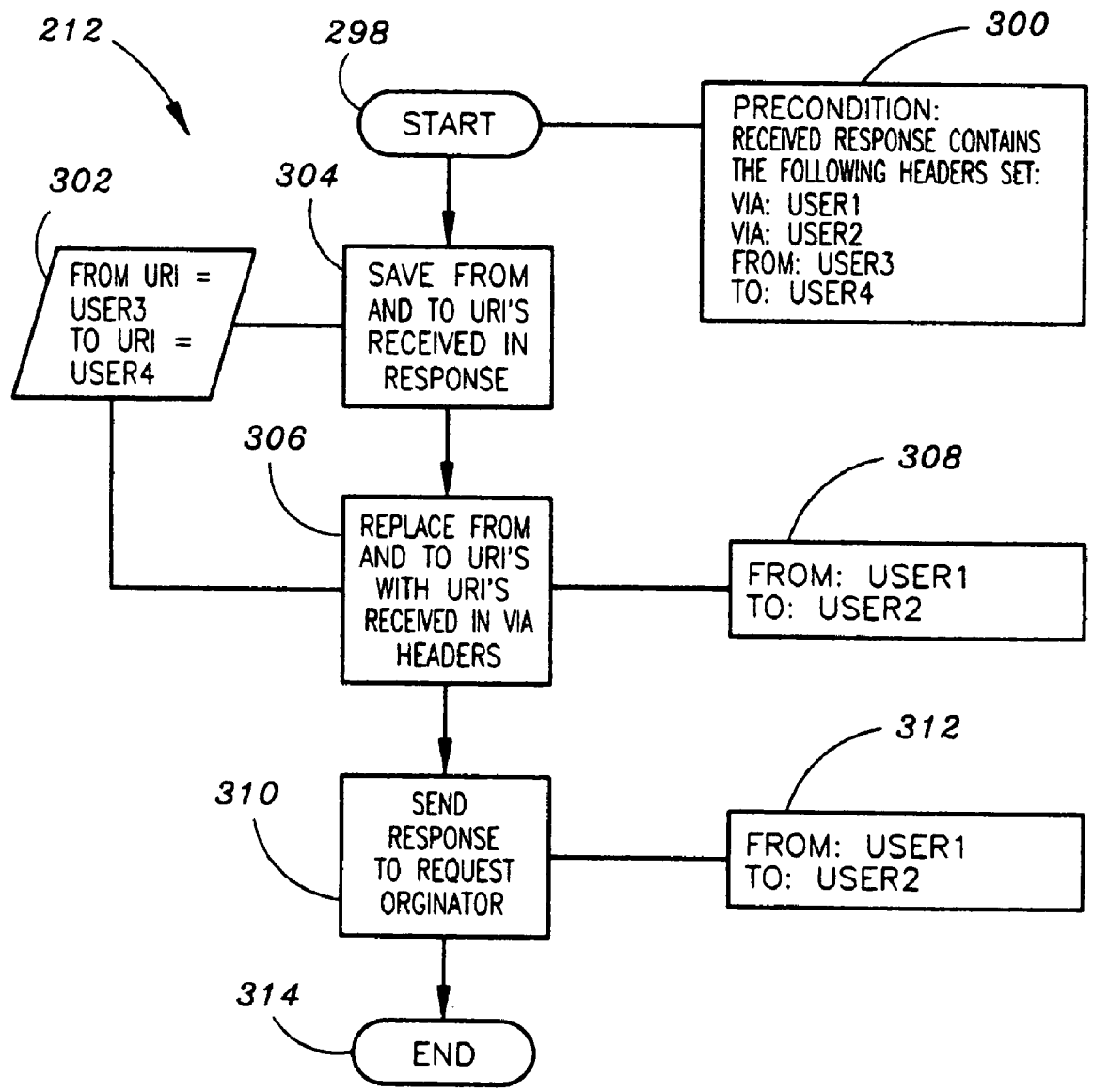
FIG. 8 is a flow diagram illustrating a sub-process of the method of FIG. 2.

Referring to FIG. 8, a flow diagram illustrating a sub-process 212 of the method 200 of FIG. 2 is shown. Sub-process 212 may be suitable for processing a provisional SIP response to a request. Sub-process may begin 298 and may be subject to a precondition 300. In the example illustrated in FIG. 8, precondition 300 may be that a received response contains a headers set comprising a via header, such as: via: user1; via: user2; and a received header from: user3; to: user4. Header URIs 302 may be received by sub-process 212. For the purposes of demonstrating sub-process 212 in a specific example, header URIs received 302 may be: from: user3; to: user4. Received header URIs 302 may be saved in a SIP response 304. Received URIs 302 may be replaced with from and to URIs received in via headers 306. For example, header URIs received in via headers 308 may be: from: user1; to: user2. Provisional response 312 may be transmitted to a request originator 310. Provisional response may be from: user1; to: user2. Transmission of provisional response to a request originator 310 may effective end 314 sub-process 212.

Figure 9:
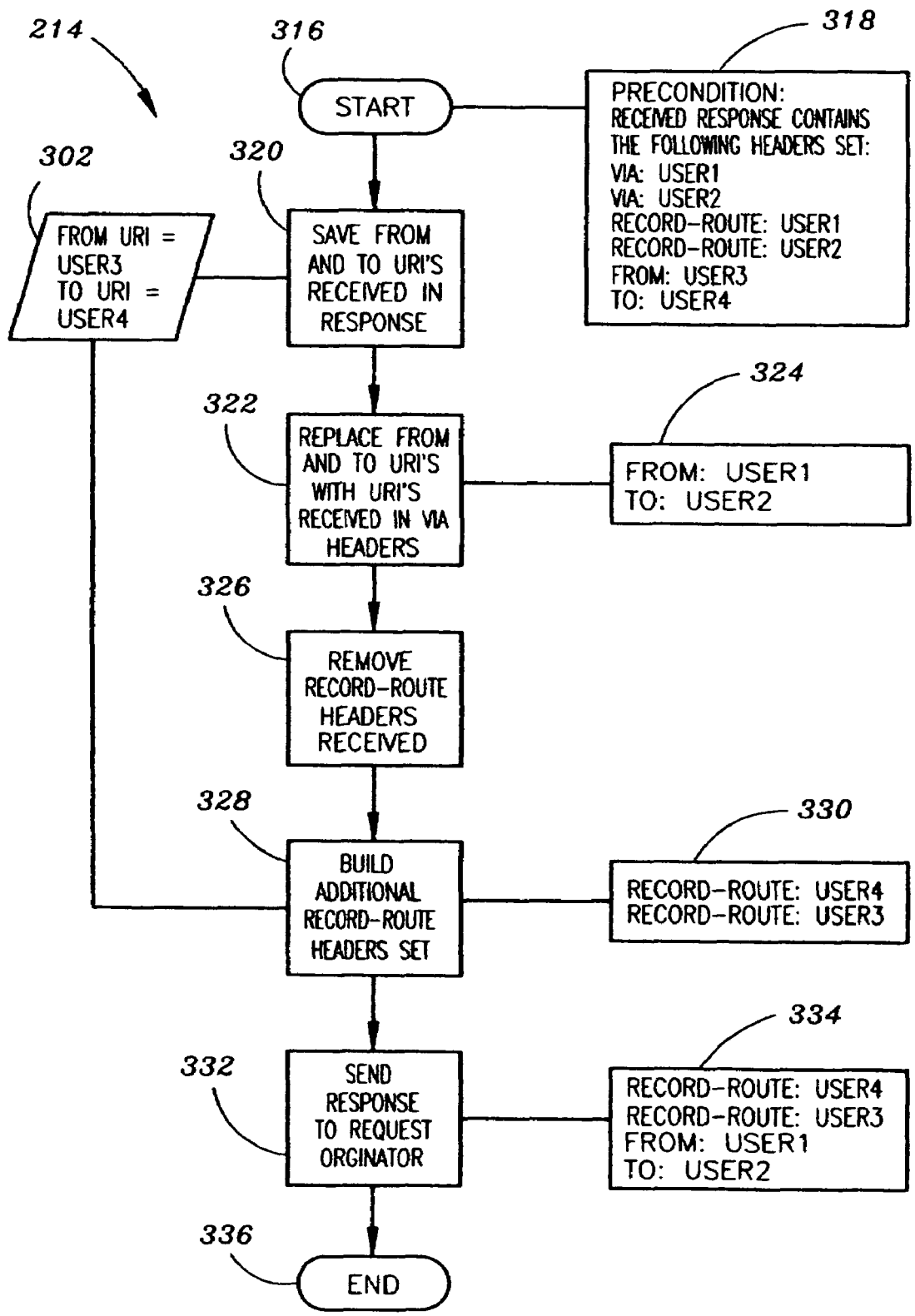
FIG. 9 is a flow diagram illustrating a sub-process of the method of FIG. 2.

Referring to FIG. 9, a flow diagram illustrating a sub-process 214 of the method 200 of FIG. 2 is shown. Sub-process may be suitable for processing a final SIP response. Sub-process 214 may begin 316, and may be subject to a precondition 318. In the example illustrated in FIG. 9, precondition 318 may be that a received response contains the following headers set: via: user1; via: user2; record-route: user1; record-route: user2; from: user3; to: user4. Header URIs 302 may be received by sub-process 214. Received header URIs 302 may be saved in a SIP response 320. Received URIs 302 may be replaced with from and to URIs received in via headers 322. For example, header URIs received in via headers 324 may be: from: user1; to: user2. Received record-route headers may be removed 326. For the purposes of the example demonstrated in FIG. 9, record-route headers may be record-route: user1; record-route: user2. An additional record-route headers 330 set may be constructed 328. Additional record-route headers set 330 may be, for example, record-route: user4; record-route: user3. A response 334 may be transmitted to a request originator 332. The response 334 may comprise, for example, the headers set: record-route: user4; record-route: user3; from: user1; to: user2. Transmitting of a response 332 to the request originator may effectively end 336 sub-process 214.

Figure 10:
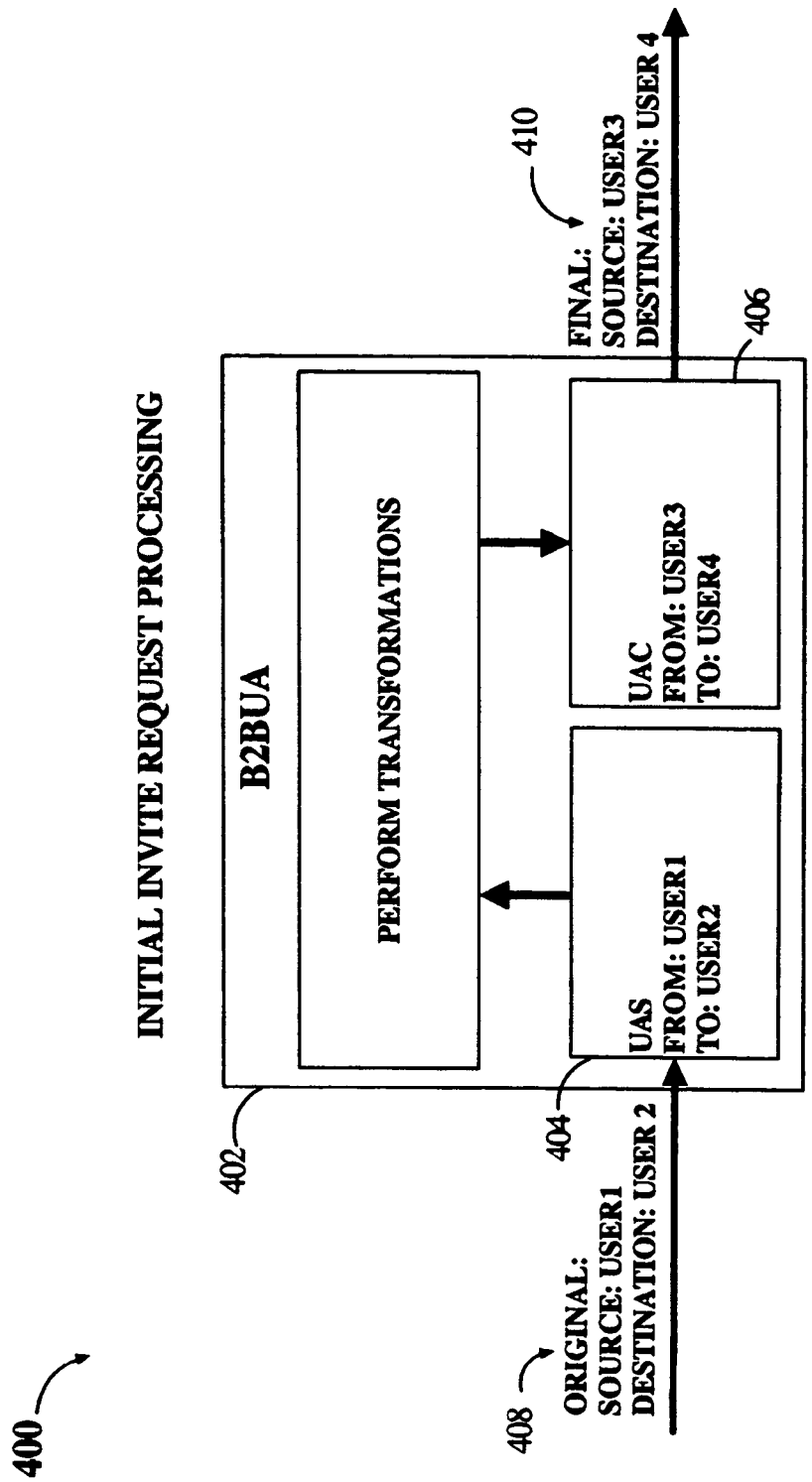
FIG. 10 is a block diagram of a system according to some embodiments of the present invention.

Referring to FIG. 10, a block diagram of a back to back user agent (B2BUA) system 400 according to some embodiments of the present invention is shown. B2BUA system 400 may comprise a B2BUA 402 which may be a concatenation of a User Agent Server (UAS) 404 and a User Agent Client (UAC) 406. System B2BUA may be suitable for inserting record-route and via headers in both the UAS 404 and UAC 406. Record-route and via headers may be suitable for transferring necessary SIP dialog state data to a corresponding endpoint and reconstructing the data back on receiving route and via headers in a subsequent SIP message received from the endpoint. Received request may comprise an original source and destination header 408. In one embodiment, original source and destination header URIs may be From: user1; To: user2. Original source and destination header 408 may be inserted into UAS 404, where system 400 may perform a transformation on the URIs. Transformation may be From and To modifications, and may be performed by utilizing static rules configured for requests originating from a particular source address or having a pattern match in a From/To/Any_Other_Headers conversion resulting in new URI/values to be set in From/To/Any_Other_Headers as a result, thereby preserving Any_Other_Headers values as Any_Other_Headers_Original. New values may be set in From/To/Any_Other_Headers in a SIP request to a newly defined destination. For instance, new values may comprise a modified request 310 and may include header URIs such as From: user3; To: user4. Additional record-route headers may be inserted into an outgoing request having original values From_Original, To_Original, Any_Other Headers_Original. An identical set of via headers may be constructed, having the same values as additional record-route headers. Via headers may be suitable for reconstructing any original values if, for example, a negative response from a new destination is received. System 400 may then transmit the modified request 410 to a new destination.

It is to be noted that in a system 400 according to an embodiment of the present invention, a dialog state may not be maintained. However a transaction may be maintained. Transaction maintenance may provide retransmit capabilities in the event a request is transmitted via unreliable transport (UDP). Request may be retransmitted via timers defined in the SIP specification and may successfully complete a request transmission or terminate a request transmission. If a transmission may not be completed successfully, such as if no response is received from a new destination, transaction may be completed by transmitting a "request timed out" response to an originator.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the elements for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the elements in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing a stateless Session Interface Protocol (SIP) back to back user agent (B2BUA) comprising:
   receiving a SIP message;
   determining if said SIP message is a SIP request;
   determining if said SIP message is a SIP response;
   transforming one or more determined said SIP request, a first record-route header being inserted into selected SIP requests to a user agent server;
   transforming one or more determined said SIP response, wherein transforming SIP messages replaces SIP dialog state information in each transformed message, said first record-route header being inserted into selected SIP responses to a user agent client, said first record-route header including Uniform Resource Identifiers (URIs) from an original said SIP dialog state information;
   transmitting each said transformed SIP request to a new destination; and
   transmitting each said transformed SIP response to a request originator.

2. The method of claim 1, further comprising inserting a first via header into said selected SIP requests.

3. The method of claim 2, further comprising inserting said first via header into said selected SIP responses, said first via header including sufficient information to reconstruct original headers.

4. The method of claim 3, wherein said first record-route header and said first via header are suitable for transferring SIP dialog state data to an endpoint.

5. The method of claim 4, wherein said first record-route header and said first via header are suitable for reconstructing said SIP dialog state data on a receiving second record-route header or a second via header in a subsequent SIP message received from said endpoint.

6. A method for providing a stateless Session Interface Protocol (SIP) back to back user agent (B2BUA) comprising:
   receiving a SIP message;
   determining if said SIP message is a SIP request, said SIP request further comprising a request to create an original SIP dialog or a request for an existing SIP dialog;
   determining if said SIP message is a SIP response, said SIP response further comprising a provisional SIP response or a final SIP response;
   transforming one or more said SIP request, a first record-route header being inserted into selected SIP requests to a user agent server;
   transforming one or more said SIP response, wherein transforming SIP messages replaces SIP dialog state information in each transformed message, said first record-route header being inserted into selected SIP responses to a user agent client, said first record-route header including Uniform Resource Identifiers (URIs) from an original said SIP dialog state information;
   transmitting each said transformed SIP request to a new destination; and
   transmitting each said transformed SIP response to a request originator.

7. The method of claim 6, further comprising inserting a first via header into said selected SIP requests.

8. The method of claim 7, further comprising inserting said first via header into said selected SIP responses, said first via header including sufficient information to reconstruct original header values.

9. The method of claim 8, wherein said first record-route header and said first via header are suitable for transferring SIP dialog state data to an endpoint.

10. The method of claim 9, wherein said first record-route header and said first via header are suitable for reconstructing said SIP dialog state data on a receiving second record-route header or a second via header in a subsequent SIP message received from said endpoint.

11. A system comprising:
    a back-to-back user agent, said back-to-back user agent further comprising:
        a user agent server and
        a user agent client, said user agent client concatenated with said user agent server to form said back-to-back user agent;
    wherein said back-to-back user agent is suitable for replacing SIP dialog state information in each SIP message and for inserting a record-route header and a via header in both selected SIP requests to said user agent server and selected SIP responses to said user agent client, said record-route header and said via header suitable for transferring SIP dialog state data to an endpoint and reconstructing said SIP dialog state data on a receiving record-route header and a receiving via header in a subsequent SIP message received from said endpoint.

12. The system of claim 11, wherein said user agent server receives a request having an original source and destination header.

13. The system of claim 12, wherein said back-to-back user agent is suitable for performing a transformation on said request, and wherein transforming SIP messages replaces SIP dialog state information in each transformed message.

14. The system of claim 13, wherein said transformation replaces a From header and a To header.

15. The system of claim 12, wherein said transformation is performed utilizing static rules configured for said request.

16. The system of claim 11, wherein said receiving via header is identical to said receiving record-route header and is suitable for reconstructing said request if a negative response from said endpoint is received.

* * * * *